(12) United States Patent
Sasaki et al.

(10) Patent No.: US 7,261,475 B2
(45) Date of Patent: Aug. 28, 2007

(54) DATA LINK MODULE

(75) Inventors: Kazuya Sasaki, Yokohama (JP);
Masato Hino, Yamanashi (JP); Shinya Suzuki, Yamanashi (JP); Makoto Miyoshi, Yokohama (JP)

(73) Assignees: Fujitsu Limited, Kawasaki (JP);
Eudyna Devices Inc., Yamanashi (JP)

(*) Notice: Subject to any disclaimer, the term of this patent is extended or adjusted under 35 U.S.C. 154(b) by 163 days.

(21) Appl. No.: 11/017,845

(22) Filed: Dec. 22, 2004

(65) Prior Publication Data

US 2005/0191013 A1 Sep. 1, 2005

(30) Foreign Application Priority Data

Mar. 1, 2004 (JP) ............................. 2004-056870

(51) Int. Cl.
*G02B 6/36* (2006.01)
(52) U.S. Cl. .......................................... 385/92; 385/88
(58) Field of Classification Search ................ 439/299, 439/300, 338, 341, 342, 345, 346, 350, 352, 439/353, 357, 367, 370, 372, 373; 385/88–94; 361/728, 747, 752, 759
See application file for complete search history.

(56) References Cited

U.S. PATENT DOCUMENTS

| | | | |
|---|---|---|---|
| RE36,820 E | | 8/2000 | McGinley et al. |
| 6,430,053 B1 | | 8/2002 | Peterson et al. |
| 6,439,918 B1 | * | 8/2002 | Togami et al. ............. 439/372 |
| 6,929,403 B1 | * | 8/2005 | Arciniegas et al. ......... 385/55 |
| 2002/0150344 A1 | | 10/2002 | Chiu et al. |
| 2005/0157474 A1 | * | 7/2005 | Larson ..................... 361/728 |
| 2005/0170695 A1 | * | 8/2005 | Togami et al. ............. 439/607 |

* cited by examiner

*Primary Examiner*—Frank G. Font
*Assistant Examiner*—Derek L. Dupuis
(74) *Attorney, Agent, or Firm*—Bingham McCutchen LLP (57) ABSTRACT

A case containing an optical interface section including a connector-fitting unit in its front portion, a printed board in its central portion, and an electrical interface section in its rear portion is accommodated in a housing. When a data link module is inserted in a cage, a housing tongue and a through hole both formed in a bottom plate of the housing are overlapped with a cage tongue and a lock pin both provided in and on a bottom plate of the cage, into and from which the data link module is inserted and removed, such that the lock pin is engaged in and locked by the lock hole. When removing the data link module from the cage, by angularly turning a bail pivotally supported by the connector-fitting unit, the cage tongue is pushed down following to the housing tongue with the camming operation of a plate cam, thus causing the lock hole to be disengaged from the lock pin.

8 Claims, 9 Drawing Sheets

DATA LINK MODULE

BACKGROUND OF THE INVENTION

1. Field of the Invention

The present invention relates to a data link module of a communication device for inputting and outputting an electrical signal or an optical signal. More particularly, the present invention relates to a data link module with a structure for locking the module.

2. Description of the Related Art

A communication device for inputting and outputting an electrical signal or an optical signal is designed in module, and a module structure capable of inserting and removing a module to and from a module-receiving cage is known. Examples of known communication devices designed in module include a module for converting an electrical data signal into an optical signal for transmission of the optical signal via an optical fiber, and a module for converting an optical signal received via an optical fiber into an electrical data signal.

In the field of optical communication devices always aiming at a further size reduction, standardization of component specifications is under progress and standards are specified regarding dimensions of modules and cages, compatibility of optical/electrical interface units, mechanical compatibility in inserting and removing modules to and from cages, etc.

Figure 1:
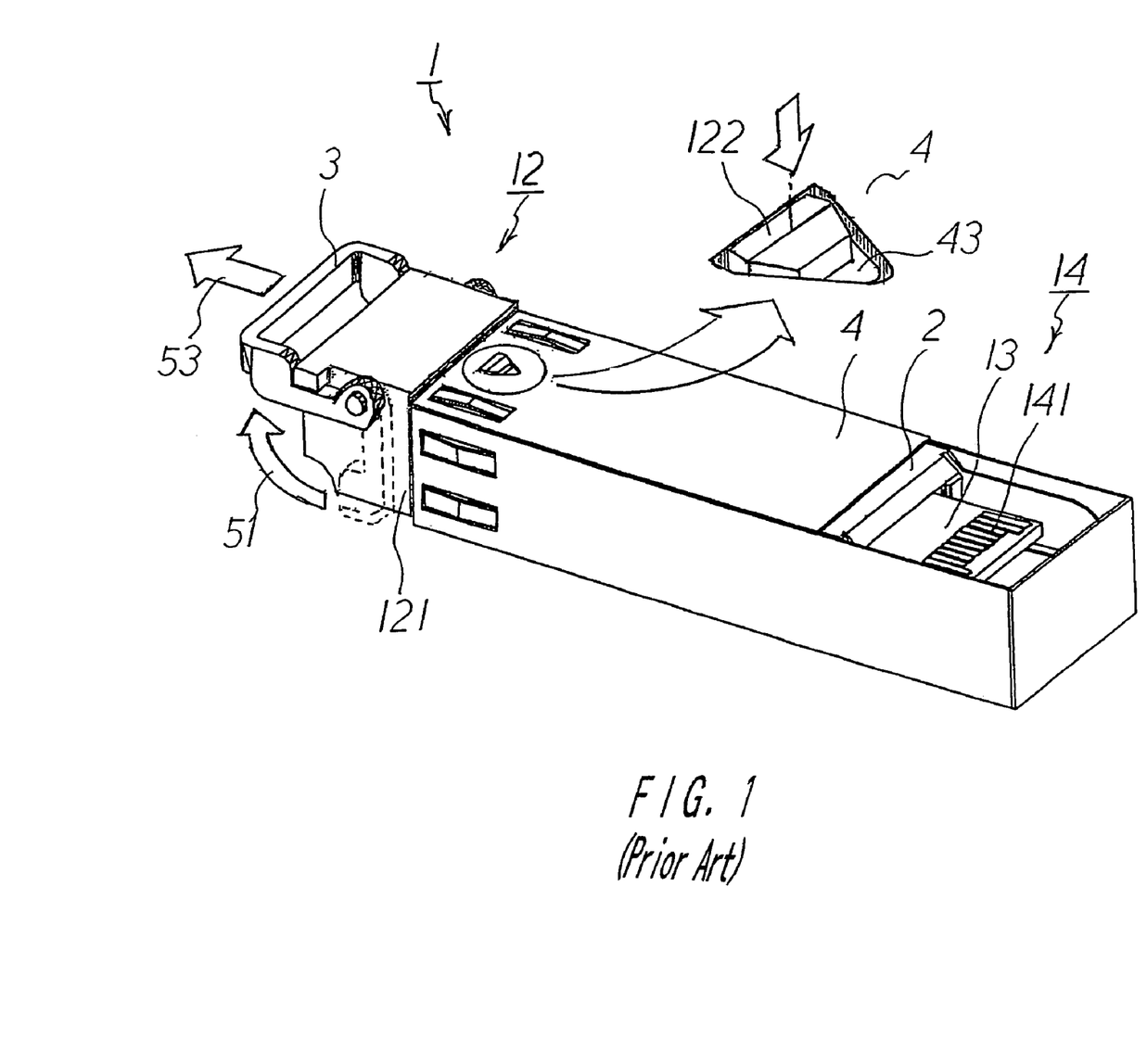
FIG. 1 is a perspective view showing one structure of a mechanism for inserting and removing an optical module used in an optical communication device (prior art)

FIG. 1 is a perspective view showing one structure of a mechanism for inserting and removing a modular optical communication device according to the related art.

Referring to FIG. 1, a removable optical module 1 is inserted in a cage 4. The optical module 1 comprises a printed board 13 including various devices mounted on it, an optical interface section 12 disposed at one end of the optical module in the lengthwise direction thereof, an electrical interface section 14 disposed at the other end of the optical module in the lengthwise direction thereof, and a housing 2 encasing the printed board 13, etc.

The printed board 13 mounts thereon various devices constituting an opto-electric converting circuit, and a power supply circuit. The optical interface section 12 disposed at one end of the optical module 1 in the lengthwise direction thereof is exposed to the exterior even in the state, shown in FIG. 1, where the optical module 1 is inserted in the cage 4. An optical fiber cable (not shown) is coupled to the optical interface section 12.

The electrical interface section 14 disposed at the other end of the optical module 1 in the lengthwise direction thereof has a printed contact 141 formed at an end of the printed board 13. In the state, shown in FIG. 1, where the optical module 1 is inserted in the cage 4, the printed contact 141 is fitted to a card edge connector provided in, e.g., a mother board (not shown) to which the cage 4 is attached.

The housing 2 serves to provide an electromagnetic shield and/or mechanical protection for the printed board 13, an optical connector, etc. which are mounted on the optical module 1. The housing 2 is fitted in the lengthwise direction so as to cover the optical module 1 from three directions except for a bottom surface or to entirely cover the optical module 1.

The optical module 1 capable of being inserted into and removed from the cage 4, shown in FIG. 1, includes a mechanism for inserting and removing the optical module 1 into and from the cage 4, and a mechanism for locking the module 1 to the cage 4 when the module is inserted in the cage.

In the state where the optical module 1 is inserted in the cage 4 as shown in FIG. 1, the optical module 1 and the cage 4 are locked to each other upon engagement of a lock pin 122 projecting on one wall surface of the optical module 1 into a lock hole 43 bored in a corresponding wall surface of the cage 4.

The optical module 1 can be removed from the cage 4 by disengaging the lock pin 122 from the lock hole 43, and then withdrawing the optical module 1 while grasping a bail 3. To withdraw the optical module 1 in the direction of arrow 53, the bail 3 is erected (turned angularly) in the direction of arrow 51 from a retracted state.

Here, when the optical module 1 is pushed and inserted in the cage 4, the lock pin 122 is spontaneously engaged in the lock hole 43 for locking between them, and when the bail 3 is erected in the direction of arrow 51, the lock pin 122 is disengaged from the lock hole 43 for unlocking. Accordingly, the optical module 1 can be easily removed from the cage 4 by withdrawing the bail 3 in the direction of arrow 53. In other words, the inserting/removing operation and the locking/unlocking operation for the optical module 1 and the cage 4 can be performed in an interlocked manner.

In one known mechanism for realizing those interlocked operations, the bail is disposed at front face of the optical module. When the bail is erected for withdrawing the bail forward, the lock pin is retracted following to the erecting movement of the bail such that the lock pin is disengaged from the lock hole.

That known mechanism is practically constituted as follows. The lock pin is projected at one end of a pivot block on one side of a shaft thereof, and the other end of the pivot block is engaged with a cam mechanism of the bail. When the bail is erected to withdraw the optical module from the cage, the other end of the pivot block is pushed up by the cam mechanism of the bail. As a reaction, one end of the pivot block is pushed down, whereupon the lock pin is retracted and disengaged from the lock hole.

In another example of known mechanisms for engaging and disengaging the lock pin with rotation of the bail, when the bail is erected, a push tab is moved and a boss is pushed down through an actuator that is caused to swing following to the movement of the push tab. Correspondingly, the lock pin is retracted and disengaged from the lock hole.

In still another example of known mechanisms for engaging and disengaging the lock pin with rotation of the bail, when the bail is erected, a slider is forced to slide to push up a tongue provided in the cage. Correspondingly, the lock pin fixedly provided on the module is disengaged from the tongue provided in the cage.

Thus, as mechanisms for unlocking the optical module from the cage when the optical module is inserted into and removed from the cage, there are known structures of withdrawing the lock pin by utilizing the torque caused when erecting the bail, the cam mechanism, and so on. In those mechanisms, however, because the lock pin is retracted with the operation of the bail, movements of the lock pin other than the vertical movement must be restricted and a plurality of movable members must be interposed between the bail and the lock pin.

Stated another way, the structure of retracting the lock pin with the operation of the bail necessarily increases the number of parts, thus resulting in the increased cost of those required parts, more complicated assembly, and hence the increased number of manufacturing steps.

Further, the dimensions of the optical module and the cage are limited, and a further reduction in size of the locking and unlocking mechanisms is demanded. From this point of view, it is disadvantageous to dispose a plurality of movable members between the bail and the lock pin.

In the case employing, as the mechanism for unlocking the optical module from the cage, the mechanism of pushing up the tongue provided in the cage, this pushing-up mechanism must be designed so as to take a position where biasing against the tongue provided in the cage is released in the stationary state.

To release that biasing, however, an operator must push the bail by a finger to bring the biasing mechanism into the release position, thus resulting in troublesome operation.

Accordingly, it is an object of the present invention to provide a data link module capable of autonomously realizing, with a simple mechanism, the position where biasing against a tongue provided in a cage is released.

SUMMARY OF THE INVENTION

The first aspect of the present invention resides in a data link module capable of being contained in a cage, the data link module having a housing which accommodates therein a lock pin capable of being engaged in a lock hole formed in a cage tongue provided in the cage, a connector-fitting unit capable of being fitted to an external connector, a bail rotatably supported by the connector-fitting unit, a transmitting device and/or a receiving device connected to the external connector, a control circuit connected to the transmitting device and/or the receiving device, and an electrical interface for connecting a potential of the control unit to the exterior, wherein the housing has a housing tongue resiliently held relative to the data link module and having a through hole in which the lock pin is loosely fitted, and when the bail is driven in a state of the data link module being inserted in the cage, the housing tongue is displaced to release an engaged state between the cage tongue and the lock pin.

In the data link module according to the first aspect of the present invention, the housing tongue is resiliently formed relative to the housing, and the engaged state between the cage tongue and the lock pin is released by causing the housing tongue to displace. Therefore, when the housing tongue is not biased to displace, the cage tongue and the lock pin are naturally maintained in an engageable state by a resilient force of the housing tongue.

With that feature, even when the housing tongue is going to be biased by erroneous operation or other reasons, such biasing can be naturally prevented and the data link module can be easily inserted in the cage.

Also, in the data link module according to the first aspect of the present invention, the bail is rotatably supported by the connector-fitting unit about a pivot shaft. Therefore, when the bail is driven, the housing tongue can be displaced by a cam provided on the pivot shaft of the bail, which serves as a cam shaft.

With that feature, the housing tongue can be displaced in link with driving of the bail by using a simple mechanism, i.e., a cam.

Further, in the data link module according to the first aspect of the present invention, the control circuit is disposed on a printed board, and the electrical interface is an external connector terminal provided at an end of the printed board, the electrical interface being connected to the exterior in the state of the data link module being accommodated in the cage.

With that feature, the electrical interface is connectable with a card edge connector, and electrical connection to the exterior can be established at the same time as when the data link module is inserted in the cage.

When the data link module is connected to the card edge connector or the like, the printed board must be restricted from moving up and down. Generally, such restriction is performed by interposing a spacer between the housing and the printed board, but there is a tolerance in the distance between the height of the printed board and the height of an inner surface of the housing.

In the data link module according to the first aspect of the present invention, while the housing tongue is resiliently joined to the housing, the housing may be entirely formed of a resilient member as an integral structure.

With that feature, the tolerance in the distance between the printed board and the housing can be absorbed by resiliency of the housing, and the height of the printed board can be easily restricted.

Moreover, in the data link module according to the first aspect of the present invention, the connector-fitting unit may be provided with a guide pin for limiting a movable range of the bail.

The housing tongue is displaced with driving of the bail. On the other hand, the housing tongue is resiliently joined to the housing, and therefore an excessive driving force must be avoided from being applied to the housing tongue. That problem can be overcome by restricting a driving stroke of the bail with the provision of a guide pin.

DESCRIPTION OF THE PREFERRED EMBODIMENTS

First Embodiment

Figure 2:
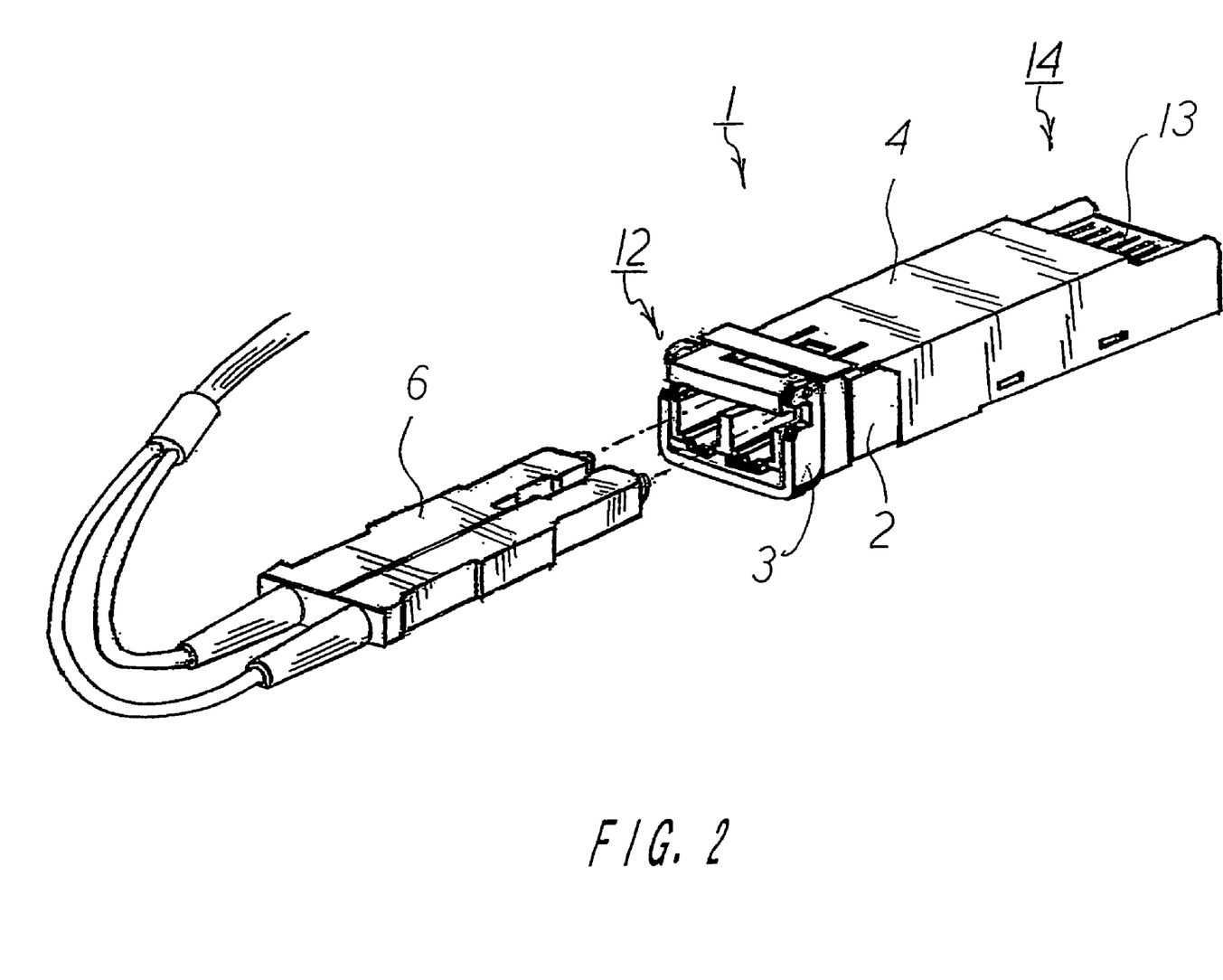
FIG. 2 is an external perspective view of an optical module of the present invention.
Figure 3A:
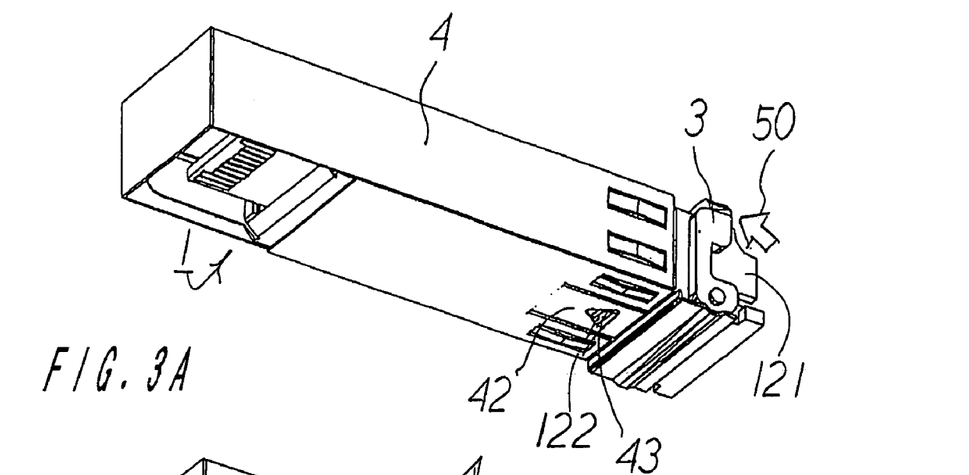
FIGS. 3A, 3B and 3C are perspective views showing operations for inserting and removing the optical module of the present invention into and from a cage, looking up from below.
Figures 3B, 3C:
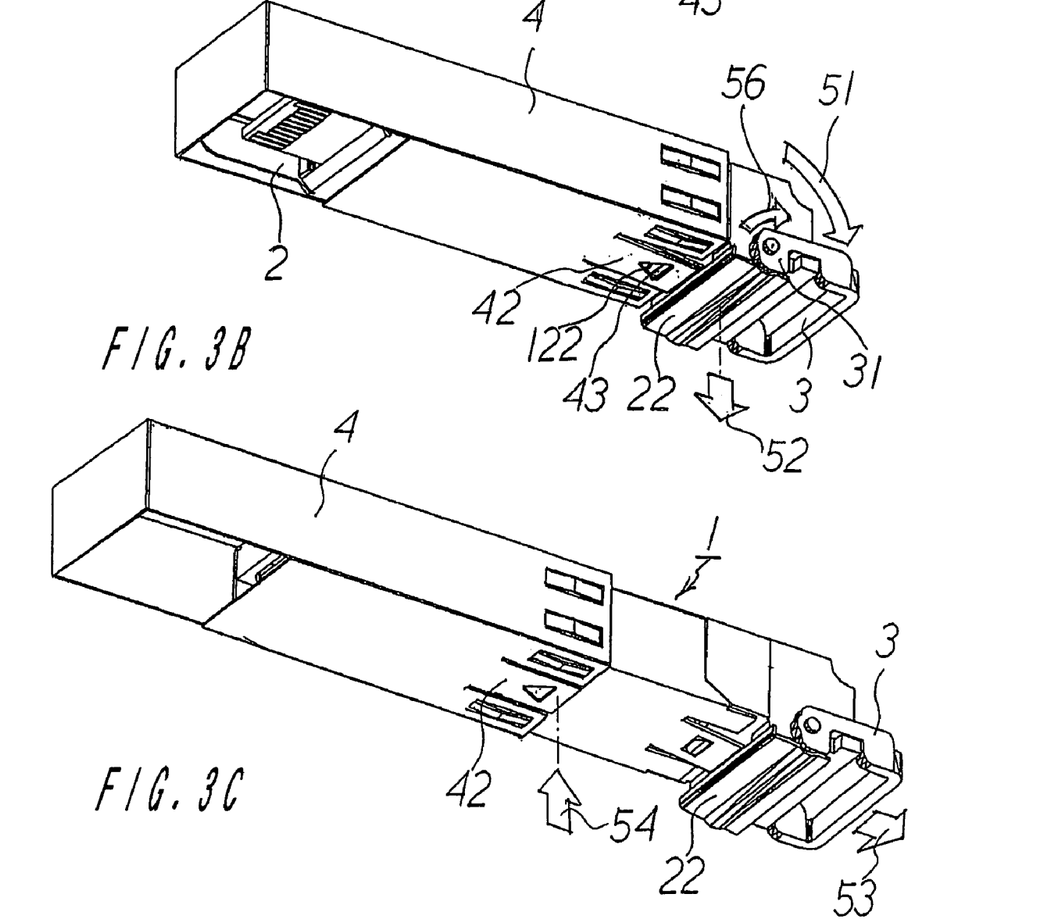
Figure 4A:
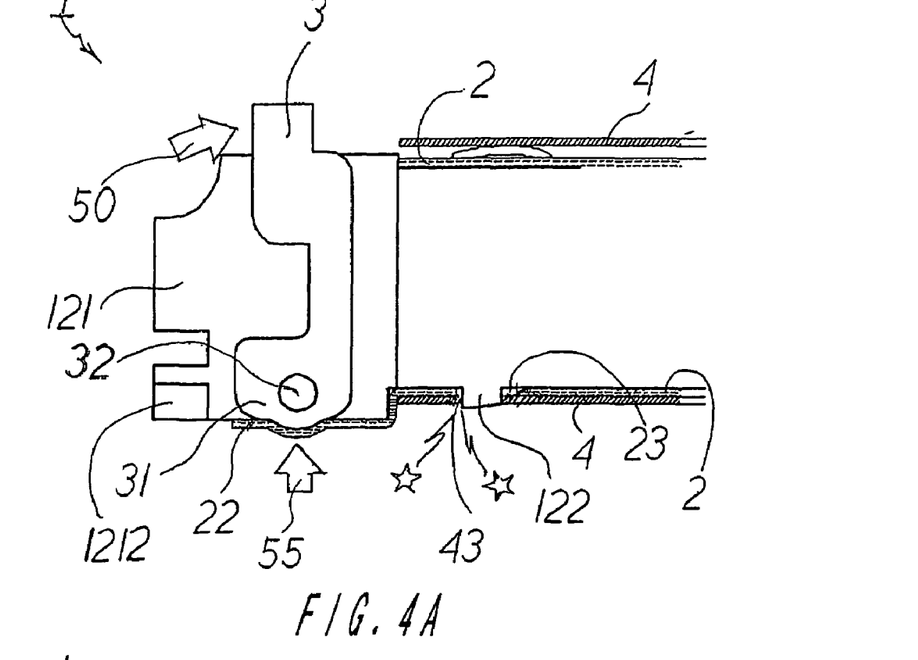
FIGS. 4A and 4B are side sectional views of principal components for explaining the camming operation of a bail.
Figure 4B:
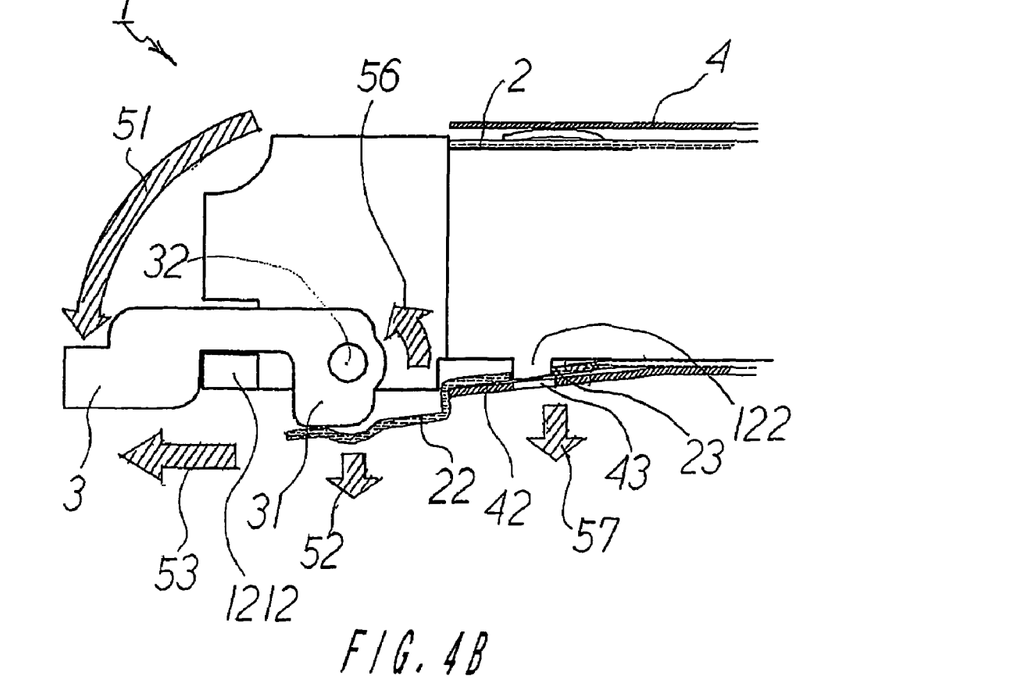

FIG. 2 is an external perspective view of a data link module of the present invention, FIGS. 3A, 3B and 3C are perspective views showing operations for inserting and removing the data link module, i.e., an optical module, of the present invention to and from a cage serving as an outer housing, looking up from below, and FIGS. 4A and 4B are side sectional views of principal components for explaining the camming operation of a bail.

Referring to FIG. 2, an optical module 1 is inserted in a cage 4 in a removable manner. The optical module 1 has an optical interface section 12 disposed at one end in the lengthwise direction thereof and an electrical interface section 14 disposed at the other end. An external connector 6 connectable with an optical fiber cable, for example, is fitted to the optical interface section 12 at one end of the optical module 1. In the electrical interface section 14 at the other end, a card edge of a printed board 13 is exposed to establish electrical connection when the optical module 1 is inserted into the cage 4 disposed in, e.g., a back panel (not shown).

In other words, the optical module 1 has an opto-electric relaying function of introducing an optical signal input and output through the external connector 6, which is connected to the optical fiber cable, etc., as an electrical signal to and from the back panel (not shown), etc.

The optical module 1 is encased in a housing 2 and is spontaneously locked in place when it is inserted into the cage 4. When removing the optical module 1, it can be easily unlocked and withdrawn by erecting (angularly turning) a bail 3 of the optical module 1.

FIG. 3A is a perspective view looking, from below, a state where the optical module 1 is inserted in the cage 4. The bail 3 is turned angularly in the direction of arrow 50 to orient vertically (stand inversely), as shown, in embracing relation to a connector-fitting unit 121. In this state, a lock pin 122 is projected through a lock hole 43 formed in an I-shaped tongue 42 of the cage 4, i.e., in a cage tongue in the present invention. To be endurable against external force acting in the direction to withdraw the optical module 1 from the state locked to the cage 4, the lock pin 122 has a polygonal or semicircular shape with one side thereof positioned on the withdrawing side. The lock hole 43 has a similar shape to that of the lock pin 122. Thus, the optical module 1 is held in the state locked to and restricted by the cage 4.

FIG. 3B is a perspective view looking, from below, a state where the bail 3 of the optical module 1 is turned angularly in the direction of arrow 51. Plate cams 31 formed at ends of both legs of the bail 3 are rotated in the direction of arrow 56, whereupon a T-shaped tongue 22 of the housing 2, i.e., a housing tongue in the present invention, is pushed down in the direction of arrow 52. Following to the pushing-down of the T-shaped tongue 22, the I-shaped tongue 42 of the cage 4 is also flexed downward. As a result, the lock pin 122 projecting through the lock hole 43 is disengaged from the lock hole 43 so that the optical module 1 is released from the state locked to the cage 4 to be freely movable.

FIG. 3C is a perspective view looking, from below, a state during the operation of withdrawing the optical module 1 from the cage 4 for removal.

While the optical module 1 is withdrawn in the direction of arrow 53 with the bail 3 held in the angularly turned horizontal state, the T-shaped tongue 22 is kept-pushed down. After passage of the T-shaped tongue 22, however, the I-shaped tongue 42 is returned to its original position in the direction of arrow 54.

FIGS. 4A and 4B are side sectional views of principal components of the optical module 1 on the withdrawing side in FIG. 3. The camming operation of the bail will be described below with reference to FIGS. 4A and 4B. The ends of both legs of the bail 3 are formed as the plate cams 31 which are pivotally supported to cam shaft 32 provided on both side surfaces of the connector-fitting unit 121.

In FIG. 4A, the bail 3 is turned angularly in the direction of arrow 50 to orient vertically, as shown, in embracing relation to the connector-fitting unit 121. In this vertically oriented state, because the plate cams 31 are oriented not to develop the camming operation, the T-shaped tongue 22 of the housing 2, which is made of a resilient member and is in abutment with the plate cams 31, is in a non-biased state in the direction of arrow 55 and remains in its original position. Therefore, the lock pin 122 is in the locked state projecting into a through hole 23 of the housing 2 and the lock hole 43 of the cage 4.

When the bail 3 is operated to turn angularly in the direction of arrow 51 as shown in FIG. 4B, the plate cams 31 are rotated in the direction of arrow 56 to bias the T-shaped tongue 22 in the direction of arrow 52. As a result, the I-shaped tongue 42 of the cage 4 is also biased in the direction of arrow 57 following to the T-shaped tongue 22, whereupon the lock pin 122 is disengaged from the through hole 23 and the lock hole 43, thus allowing the optical module 1 to be withdrawn from the cage 4 in the direction of arrow 53 for removal.

By forming the I-shaped tongue 42 and the T-shaped tongue 22 using resilient members, it is possible to satisfactorily repeat biasing and non-biasing of the T-shaped tongue 22 and the I-shaped tongue 42 which are caused by the plate cams 31 with the operation of the bail 3.

More specifically, when the optical module 1 is inserted into the cage 4 with the bail 3 held in the vertically oriented state, the I-shaped tongue 42 is temporarily biased downward when the lock pin 122 projecting out of the through hole 23 passes. Thereafter, when the lock pin 122 is engaged in the lock hole 43, the I-shaped tongue 42 is released from the biasing and returns spontaneously to its original position. Hence, the optical module 1 is locked to the cage 4 and is completely inserted for attachment in place.

In the case of removing the optical module 1 from the cage 4, by angularly turning the bail 3 from the vertically oriented state, the camming operation of the plate cams 31 causes the T-shaped tongue 22 and the I-shaped tongue 42 to be biased downward in following relation, whereupon the lock pin 122 is disengaged from the through hole 23 and the lock hole 43. By withdrawing the optical module 1 from the cage 4 in that state, the I-shaped tongue 42 is released from the biasing and returns spontaneously to its original position after the through hole 23 has passed the lock pin 122.

The bail 3 is rotatably supported by the cam shafts 32 that is in turn supported by the connector-fitting unit 121, and the T-shaped tongue 22 of the housing 2 is displaced with driving, i.e., the angular turning, of the bail 3. However, because the T-shaped tongue 22 is provided in the housing 2 so as to develop a resilient deformation, an excessive driving force must be avoided from being applied from the bail 3 to the T-shaped tongue 22 of the housing 2. To that end, a guide pin 1212 is projected on the connector-fitting unit 121. The bail 3 strikes against the guide pin 1212, and restrict excessive driving of the bail 3.

Figure 5A:
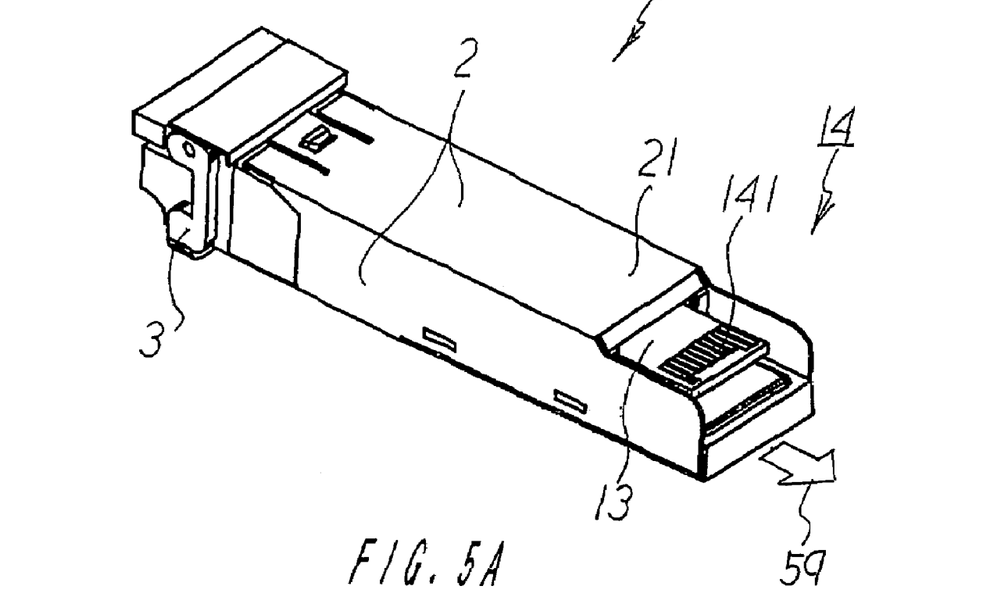
FIGS. 5A and 5B are perspective views of the optical module of the present invention with a bottom surface faced upward.
Figure 5B:
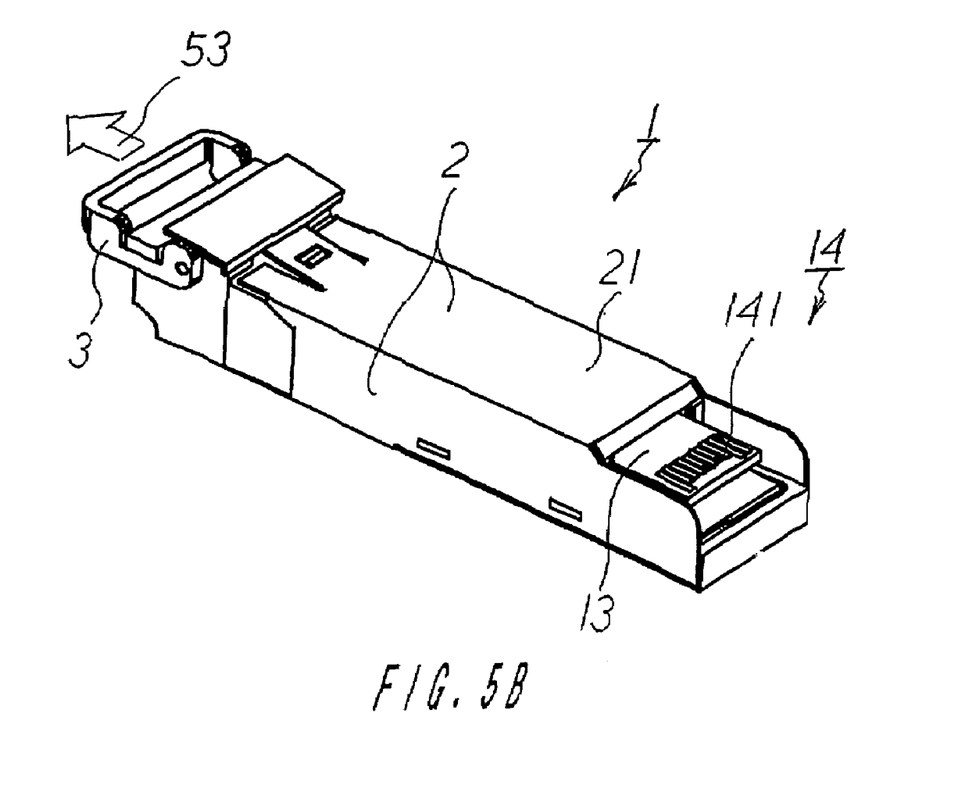

FIGS. 5A and 5B are perspective views of the optical module, i.e., the data link module, of the present invention with a bottom surface faced upward. FIG. 5A shows the case in which the bail 3 is angularly turned to the vertically oriented state and the optical module 1 is inserted into the cage (not shown in FIG. 5A) in the direction of arrow 59. FIG. 5B shows the case in which the bail 3 is angularly turned from the vertically oriented state and the optical module 1 is withdrawn from the cage (not shown in FIG. 5A) for removal in the direction of arrow 53.

In the electrical interface section 14 of the optical module 1, a bottom plate 21 of the housing 2 encasing the optical module 1 is opened in its rear portion where a printed contact 141 disposed at the end of the printed board 13 is exposed to the exterior.

Accordingly, when the optical module 1 is inserted into the cage and is attached in a predetermined position, the printed contact 141 is automatically fitted to, e.g., a card edge connector (not shown) for connection of the electrical interface section 14.

When removing the optical module 1 from the cage, the printed contact 141 can be automatically disconnected by angularly turning the bail 3 from the vertically oriented state and withdrawing the optical module 1 for removal.

Second Embodiment

Figure 6:
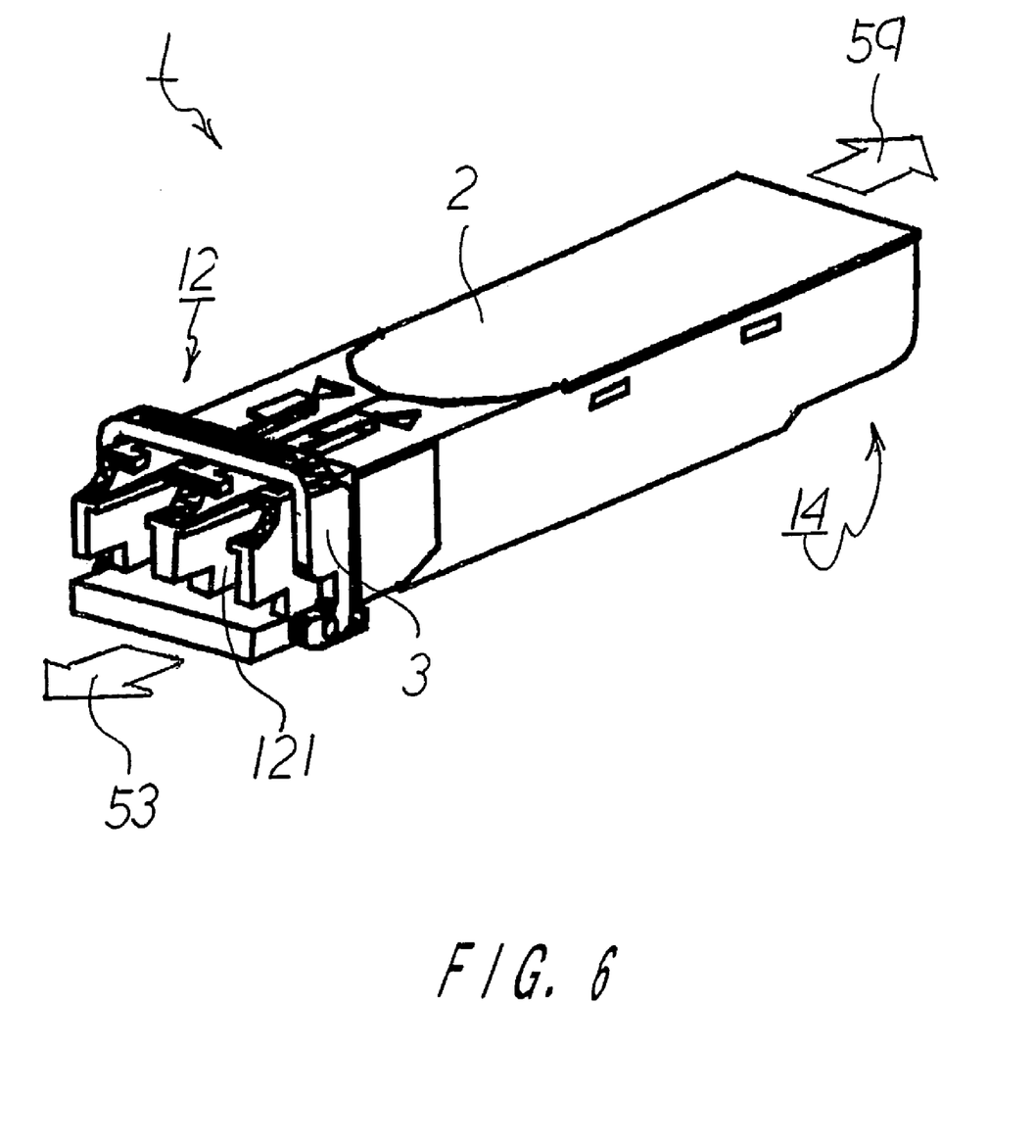
FIG. 6 is an external perspective view of the optical module of the present invention, looking it placed in a normal state.
Figure 7:
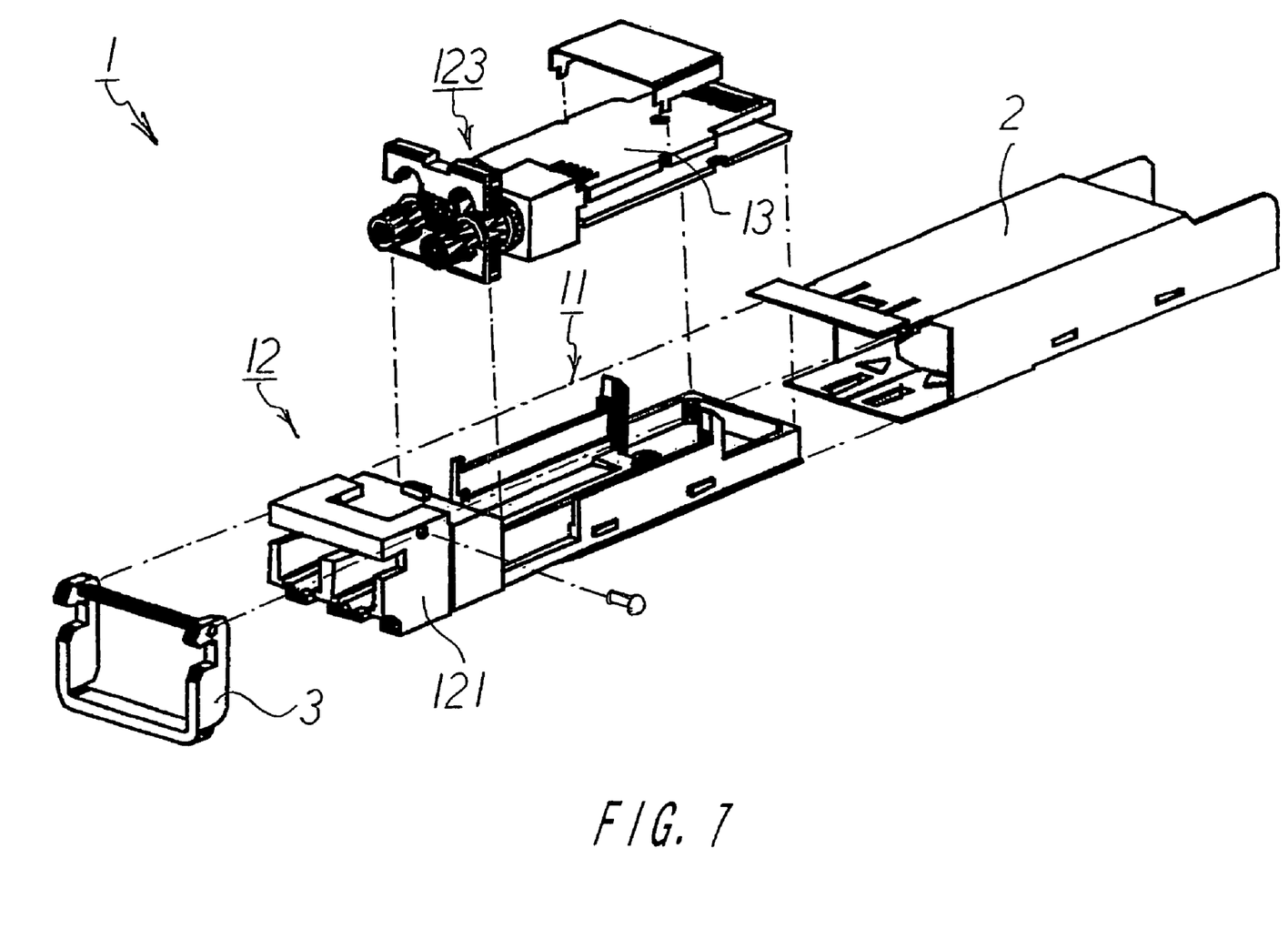
FIG. 7 is an exploded perspective view of an optical module of the present invention, looking it placed upside down.

FIG. 6 is an external perspective view of the optical module, i.e., the data link module, of the present invention, looking it placed in a normal state, and FIG. 7 is an exploded perspective view of the optical module, i.e., the data link module, of the present invention, looking it placed upside down. FIGS. 8A, 8B, 8C and 8D are sets of perspective views for explaining assembly steps 8A, 8B, 8C and 8D of the optical module.

While FIGS. 3A, 3B and 3C are illustrated as perspective views looking from below for the purpose of explaining the structure provided on the bottom surface of the optical module for locking and unlocking the optical module and the cage when the former is inserted into and removed from the latter, FIG. 6 is a perspective view looking from above.

Thus, the optical module 1, i.e., the data link module, of the present invention is inserted into the cage (not shown in FIG. 6) by angularly turning the bail 3 to the vertically oriented state and pushing the optical module 1 in the direction of arrow 59 while holding it in a posture shown in FIG. 6. Also, the optical module 1 is removed from the cage by angularly turning the bail 3 from the vertically oriented state and withdrawing the optical module 1 in the direction of arrow 53.

A front portion of the optical module 1, as viewed in FIG. 6, is formed as the optical interface section 12 to which an optical fiber cable (not shown) is detachably fitted through two cavities formed in the connector-fitting unit 121. The printed board mounting thereon an opto-electric converting device, etc. is mounted in a central portion of the optical module 1. As the printed board is covered with the housing 2, the printed board is not shown in FIG. 6. Further, a rear portion of the optical module 1 is formed as the electrical interface section 14 where the printed contact is disposed at the end of the printed board and is exposed to the exterior through a bottom opening of the housing 2. By inserting and removing the optical module 1 into and from the cage (not shown in FIG. 6), the printed contact is spontaneously attached to and detached from, e.g., the card edge connector disposed in a motherboard. The printed contact does not appear in the perspective view of FIG. 6, looking from the front upper side.

As shown in the exploded perspective view of FIG. 7, the optical module 1 can be divided into a case 11, the connector-fitting unit 121 constituting the optical interface section 12, the housing 2 containing the case 11, the bail 3 pivotally supported by the connector-fitting unit 121, and the printed board 13 which is placed in the case 11 and mounts thereon an optical connector assembly 123, an opto-electric converting device, etc.

The optical connector assembly 123 includes a spacer for positioning receptacles of an optical connector and an electrical connector for an optical signal and an electrical signal input to and output from the printed board 13. The spacer also serves to fix the receptacles and to more reliably ensure electromagnetic shielding for the printed board 13.

FIGS. 8A, 8B, 8C and 8D show assembly steps. The optical module 1 is assembled by successively stacking the various components upside down.

Figures 8A, 8B, 8C:
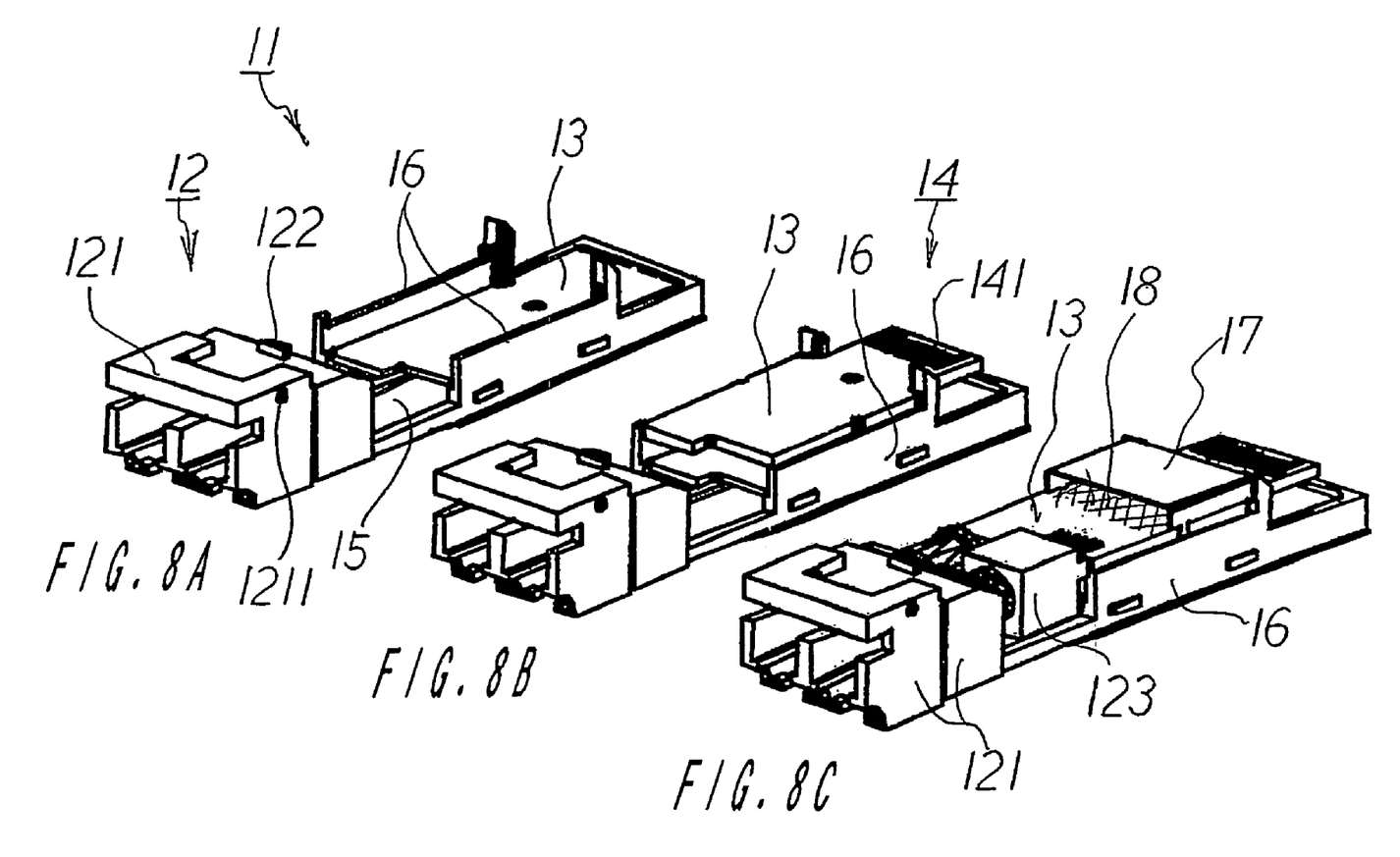
FIGS. 8A, 8B, 8C and 8D are sets of perspective views for explaining assembly steps 8A, 8B, 8C and 8D of the optical module of the present invention.

More specifically, in the step FIG. 8A, a top plate 15 of the case 11 is positioned at the bottom, and the optical interface section 12 is positioned on the front side as viewed in FIG. 8A. The connector-fitting unit 121 is fixed to the top plate 15. Shaft support holes 1211 for the cam shafts, over which the bail is pivotally supported in a later step, are formed in both side surfaces of the connector-fitting unit 121. The lock pin 122 is projected on an upper surface of the connector-fitting unit 121 as viewed in FIG. 8A, i.e., on a bottom surface thereof in practical use. Guide members 16 for holding the printed board 13 are provided on both sidewall surfaces of the case 11. First, one part of the printed board 13, which forms a second floor in practical use of the printed board 13 assembled in two stories, is mounted in bridging relation to the guide members 16.

Then, in the step of FIG. 8B, another part of the printed board 13, which forms a first floor in practical use of the printed board 13 assembled in two stories, is mounted in bridging relation to the guide members 16. The printed contact 141 is formed in a rear end portion of the first floor of the printed board 13 on the side providing its lower surface in practical use. Even after the case 11 is accommodated in the housing in a later step, the printed contact 141 is exposed to the exterior to constitute the electrical interface section 14 of the optical module 1.

Then, in the step FIG. 8c, the optical connector assembly 123 is mounted behind the connector-fitting unit 121. Further, to ensure a gap below the underside of the printed board 13 in practical use when the case 11 is accommodated in the housing in a later step, a positioning plate 17 serving as a spacer member is held in bridging relation to the guide members 16. Because of the positioning plate 17 being biased by resiliency of the housing, even if there is a variation (tolerance) of the distance between the printed board 13 and the housing, the variation can be absorbed.

In many cases, the printed board 13 mounts thereon various devices generating a large amount of heat, such as a transmitting driver and a receiving main amplifier. In this embodiment, therefore, the positioning plate 17 is made of, e.g., a metallic thin plate for the purpose of providing electromagnetic shielding and thermal conductivity. As an alternative, it is also effective to interpose, in the gap between the printed board 13 and the positioning plate 17, a heat-radiating member 18 made of silicone resin, for example, which exhibits not only electrical insulation, but also relatively high thermal conductivity.

Figure 8D:
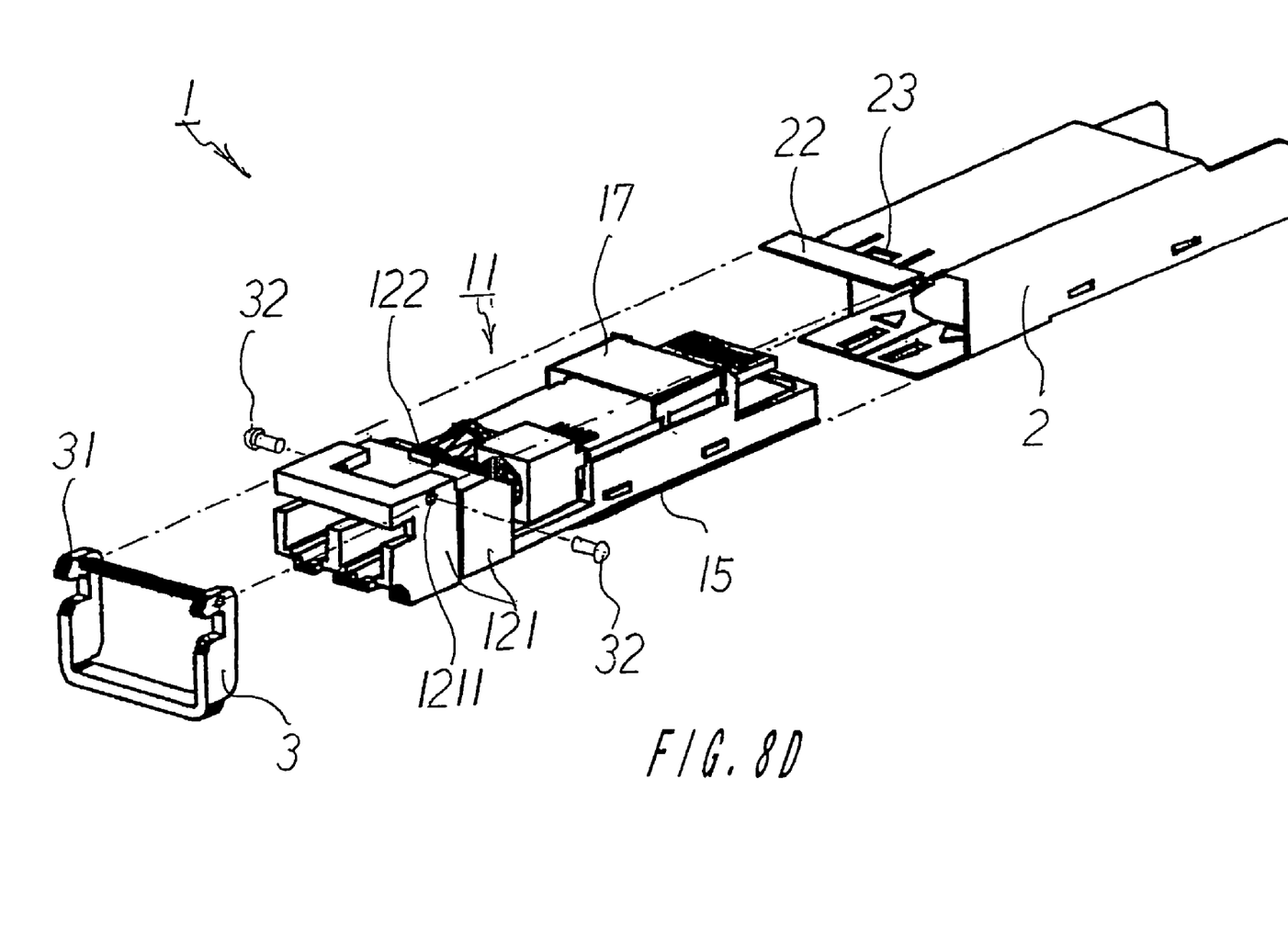

Then, in the step of FIG. 8D, the bail 3 is pivotally supported by fitting the cam shafts 32 to the shaft support holes 1211 formed in both the lateral surfaces of the connector-fitting unit 121. Subsequently, the case 11 is accommodated into the housing 2 while the bail 3 is angularly turned to the vertically oriented state, as shown, so that the plate cams 31 will not project out of the connector-fitting unit 121.

In the housing 2, the T-shaped tongue 22 is formed beforehand in its upper front portion as viewed in FIG. 9, which serves as a portion of the bottom plate 21 thereof in practical use, and the thorough hole 23 is formed in a central portion of the T-shaped tongue 22. Then, the case 11 is accommodated in the housing 2 while sliding the positioning plate 17 along the top plate 15 such that both wings of the T-shaped tongue 22 are positioned on the plate cams 31 and the lock pin 122 is loosely fitted in the through hole 23. The assembly of the optical module 1 is thereby completed.

In such a manner, the optical module shown in FIG. 6 is completely assembled. However, the optical module structure of the present invention includes, in addition to the optical module constructed as described above, the I-shaped tongue and the lock hole both formed in a front portion of the bottom plate of the cage, into which the optical module is inserted, such that the I-shaped tongue and the lock hole overlap respectively legs of the T-shaped tongue and the through hole both formed in the housing.

The plate cams operated with the angular turning of the bail to and from the vertically oriented state serves as a driver to move the T-shaped tongue up and down as a driven member, thus causing the I-shaped tongue to move also up and down in a following manner. Correspondingly, the operation of engaging and disengaging the lock pin and the lock hole is realized. As a result, the optical module can be easily inserted into and removed from the cage without needing complicated movable members.

The T-shaped tongue provided in the housing or the I-shaped tongue provided in the cage are not limited to an integral structure for allowing them to exhibit resiliency. Shapes of the T-shaped tongue and the I-shaped tongue can also be modified into various suitable ones.

Furthermore, the lock pin and the lock hole are just required to engage with each other for locking, and their shapes can also be modified into various suitable ones.

Additionally, the engaging/disengaging mechanism of the data link module according to the present invention is applicable to other devices or units that are in mutually inserted and removed relation, and it can be modified in various ways.

It is needless to say that, while the above embodiments have been described as employing the optical module as the data link module, the present invention can be similarly applied to the case in which the data communication method employs not an optical signal, but an electrical signal.

What is claimed is:

1. A data link module having a cage capable of inserting thereto and pulling out therefrom an optical module, comprising:
   a housing encasing the optical module;
   a housing tongue formed on the housing and provided with a housing lock hole, the housing tongue capable of being biased;
   a cage tongue formed on the cage, the cage tongue capable of being biased;
   a cage lock hole formed on the cage tongue;
   a lock pin formed on the optical module, the lock pin being projected from both the housing lock hole and the cage lock hole so as to be locked to the cage, upon inserting the optical module into the cage; and
   a bail combined with the optical module, the bail including a pivot and a cam around the pivot, the cam being adapted to press the housing tongue and thereby moving the cage tongue, wherein the bail disengages the cage lock hole from the lock pin by being rotated around the pivot.

2. The data link module of claim 1, wherein both the housing tongue and the cage tongue are made of a resilient material.

3. The data link module of claim 1, wherein the housing is made of a resilient material.

4. The data link module of claim 1, further comprising a guide pin formed on the optical module for limiting a movable range of the bail.

5. The data link module of claim 1, the optical module further comprising a transmitting device for an optical signal and/or a receiving device for an optical signal and a control circuit, the optical module having an optical signal interface section and an electrical signal interface section.

6. The data link module of claim 5, the optical module further comprising:
   a printed board, wherein the transmitting device and/or the receiving device are placed on the printed board; and
   a spacer member is interposed between the printed board and the housing.

7. The data link module of claim 6, wherein the electrical signal interface section is an a external connector terminal provided at an end of the printed board, and the electrical signal interface section is connected when the optical module is inserted into the cage.

8. The data link module of claim 5, the optical module further including a spacer disposed therein for positioning the transmitting device and for the receiving device.

* * * * *